(No Model.)
J. W. CALEF.
SEEDER.
No. 401,128. Patented Apr. 9, 1889.
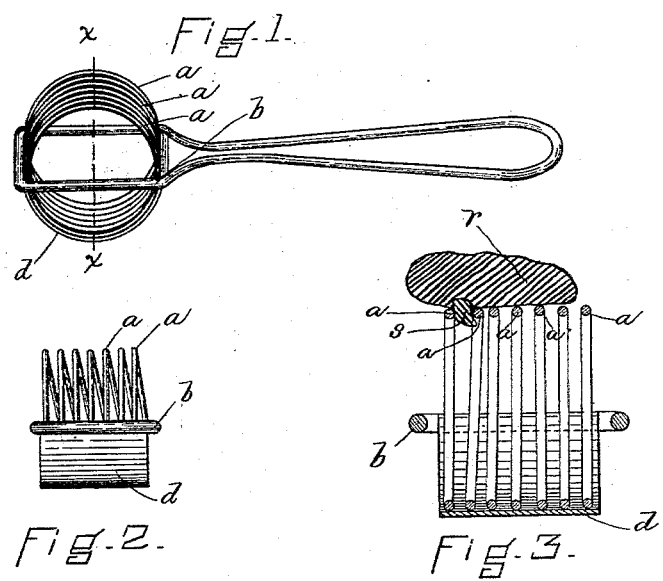
WITNESSES:
H. Brown
A. D. Harrison
INVENTOR:
J. W. Calef
by Wright Brown Crosley
Attys.

UNITED STATES PATENT OFFICE.

JOSEPH W. CALEF, OF NORTH EASTON, ASSIGNOR, BY MESNE ASSIGNMENTS, TO ALLEN G. LOVELL, TRUSTEE, OF BOSTON, MASSACHUSETTS.

SEEDER.

SPECIFICATION forming part of Letters Patent No. 401,128, dated April 9, 1889.

Application filed December 10, 1888. Serial No. 293,130. (No model.)

*To all whom it may concern:*

Be it known that I, JOSEPH W. CALEF, of North Easton, in the county of Bristol and State of Massachusetts, have invented certain new and useful Improvements in Raisin-Seeders, of which the following is a specification.

This invention consists in a series of elastic wire ribs preferably arranged in loops or bows, suitably secured to a holder, and arranged to catch the seeds or stones of raisins pressed against said ribs, the ribs supporting the raisin while the seeds are pressed through the skin of the raisin and between the ribs, the latter being so spaced that they will be slightly displaced when a seed comes between any two of them, the spaces between the ribs being slightly narrower than the average diameter of the seeds, so that after a seed has passed between two of the ribs it will be caught behind the ribs.

Of the accompanying drawings, forming a part of this specification, Figure 1 represents a perspective view of my improved raisin-seeder. Fig. 2 represents an end view of the same. Fig. 3 represents an enlarged section on line $x\ x$, Fig. 1.

The same letters of reference indicate the same parts in all the figures.

$a\ a\ a$ represent the wire ribs, which are here shown as composed of coils of a spirally-wound wire soldered or otherwise attached to a holder or handle, $b$. The ribs may be straight or of any other desired form instead of being curved, if desired; but I prefer the curved form, because the ribs are thereby kept in place and are less liable to be bent by the pressure of the raisins than if they were straight.

The ribs should be separated by spaces slightly narrower than the minimum thickness of a raisin-seed, and the wire of which they are made should be sufficiently flexible to permit the ribs to spring apart and allow a raisin-seed to pass between them.

A curved sheet-metal shield or cover, $d$, may be attached to one side of the holder to cover the coils at one side and support the pressure exerted on the operative sides of the coils. When a raisin, $r$, is pressed against the ribs, the seeds $s$ are caused by the pressure to break through the skin and pass between the ribs, the latter yielding or springing apart to permit the passage of the seeds, as indicated in Fig. 3, and springing back after the seeds have passed into the interior of the coil, thus preventing the seeds from adhering to the body of the raisin, so that when the latter is removed from the ribs the seeds will remain.

I claim—

1. A raisin-seeder composed of a handle or holder and a series of elastic ribs secured to said holder and adapted to yield laterally, said ribs being separated by spaces which permit the ribs to separate, but are of less width than the thickness of a raisin-seed, whereby the ribs are adapted to first yield or open and permit the passage of a seed between them and to then close and prevent the withdrawal of the seed, as set forth.

2. A raisin-seeder composed of a spirally bent or coiled wire and a handle or holder secured to said wire and formed to inclose portions of the coils, the remaining portions projecting from said holder and constituting elastic convex ribs, which are separated by spaces narrower than the thickness of a raisin-seed, as set forth.

3. In a raisin-seeder, the combination of the spiral wire, the handle formed to receive said wire, and the curved plate $d$, secured to said handle and covering portions of the coils of the wire, the remaining portions of said coils projecting from the plate $d$ and constituting elastic convex ribs, as set forth.

In testimony whereof I have signed my name to this specification, in the presence of two subscribing witnesses, this 5th day of December, A. D. 1888.

JOSEPH W. CALEF.

Witnesses:
C. F. BROWN,
A. D. HARRISON.